US006977675B2

United States Patent
(12) United States Patent
Kotzin

(10) Patent No.: US 6,977,675 B2
(45) Date of Patent: Dec. 20, 2005

(54) METHOD AND APPARATUS FOR VIRTUALLY EXPANDING A DISPLAY

(75) Inventor: Michael Kotzin, Buffalor Grove, IL (US)

(73) Assignee: Motorola, Inc., Schaumburg, IL (US)

(*) Notice: Subject to any disclaimer, the term of this patent is extended or adjusted under 35 U.S.C. 154(b) by 549 days.

(21) Appl. No.: 10/331,384

(22) Filed: Dec. 30, 2002

(65) Prior Publication Data

US 2004/0125085 A1 Jul. 1, 2004

(51) Int. Cl.[7] .......... H04N 5/228
(52) U.S. Cl. .......... 348/208.2; 348/333.01; 345/156
(58) Field of Search .......... 348/345, 208.2, 348/333.01, 62; 345/156, 157, 158, 864

(56) References Cited

U.S. PATENT DOCUMENTS 4,393,379 A * 7/1983 Berting et al. .......... 345/100
5,602,566 A 2/1997 Motosyuku et al.
6,359,603 B1 * 3/2002 Zwern .......... 345/8
6,400,376 B1 6/2002 Singh et al.
6,433,793 B1 * 8/2002 Ootsuka .......... 345/684
6,466,198 B1 * 10/2002 Feinstein .......... 345/158

FOREIGN PATENT DOCUMENTS

JP 7-271505 * 10/1995

* cited by examiner

*Primary Examiner*—David L. Ometz
*Assistant Examiner*—Gevell Selby
(74) *Attorney, Agent, or Firm*—Lawrence J. Chapa

(57) ABSTRACT

A display circuit for use in a hand held device is provided, which virtually expands the image displayed. The display circuit includes a display, a memory, a motion sensor, and a controller. The display has a predetermined size, and the memory has stored therein an image, which has an image size, that is larger than the size of the display. The motion sensor detects the movement of the hand held device and the corresponding movement of the display. The controller, which is coupled to the motion sensor, via prestored instructions, determines the current position of the hand held device and displays a portion of the image on the display, corresponding to the present position of the device. As the hand held device moves, the image being displayed on the display is panned an amount, which matches the movement of the hand held device.

20 Claims, 4 Drawing Sheets

METHOD AND APPARATUS FOR VIRTUALLY EXPANDING A DISPLAY

FIELD OF THE INVENTION

The present invention relates generally to devices having one or more displays for conveying visual information to a user and, more particularly, to devices where the display is smaller than the image to be displayed.

BACKGROUND OF THE INVENTION

In many instances, the information to be conveyed to a user does not conveniently fit within the constraints of the size of the available display of a device. This can be especially problematic, where the size of the display is relatively small. The size of the display is often dictated by the size of the device in which the display is used.

For many handheld type devices, like wireless communication devices, there is a trend toward smaller devices. Smaller devices are easier to carry on one's self, where the smaller the device, the greater the number of options for the location where the user can store the device (i.e a pocket, a belt clip, a small hand bag, etc.). However, as the device size decreases, so does the surface area of the device, where the components are located, which the user uses to interface with the device. For example, displays, microphones, speakers and keypads are typically located at various positions around the external surface of the device, where they are conveniently accessible by the user.

The amount of surface area of the device can be increased, by allowing the device to fold open during usage. The device is allowed to fold closed when the device is ready to be stored or the device is to be used in a more limited fashion, where more limited user interaction may only be required. However, when it comes to displays, there seems to never be enough room to display all of the information, that one would want to display on the screen.

Many devices use scrolling to accommodate the selective displaying of the most relevant information, or selectively between equally relevant information that will not fit on the screen at one time. Generally, the scrolling is controlled by the depression of one of two or four buttons, which each controls the scrolling of the information displayed on the screen in one of at least a couple of directions. Where the information extends beyond the size of the screen in a single dimension, two buttons are usually sufficient to move the information being displayed either up and down, or left and right. Where the information extends beyond the size of the screen in two dimensions, four buttons are often used to pan the display, either up, down, left or right. However, where buttons have largely been used to control scrolling in many devices, other alternative techniques have also been developed.

At least one prior patent, Singh et al., U.S. Pat. No. 6,400,376, uses the relative movement of the device to control the direction in which the display pans. A further prior patent, Motosyuku et al., U.S. Pat. No. 5,602,566, controls the direction and speed of the scrolling, by detecting the direction and the degree of the tilt of a device. However, in each instance the amount of information being conveyed to the user by the display at any one time is limited by the amount of information that can be displayed on the screen at the same time.

Consequently, in order to display a greater amount of information to the user, than the amount of information, which can be displayed on the display at any one time, without increasing the screen size, there is a need for a method and apparatus for virtually expanding the display.

Most users' eyes experience what is commonly referred to as "persistence of vision". Others, including psychologists, have referred to this effect as "positive after images". In essence, there is a delay between the time that a changing image will blur between one image and the next. The delay is often associated with the contrast or brightness of different elements from each of the images. For example if one stares at a bright light, an after image of the light will remain for a period of time, even after one looks away from the bright light, or closes one's eyes. Additionally, the brain can at times perceive the movement between two related still images, that are viewed sequentially. In this way, sequentially viewed still images, observed in sequence at a sufficiently fast rate, like a motion picture, will give the appearance of smooth continuous movement.

Early experiments associated with "persistence of vision" suggest that a minimum of 10 separate frames per second is necessary to give the illusion of movement. However at 10 frames per second there is substantial flicker. A flicker rate on the order of at least 50 frames per second is necessary for the flicker of the image not to be obvious. In some instances, a frame can include a repeated frame or an image that has been flashed multiple times. In this instance, the multiple flashings count as multiple frames within the 50 frames per second. In effect requiring that the image displayed on the screen be updated at a reduced rate. In the early days of motion pictures, this effect was created by using a multiple bladed shutter.

The present inventor has recognized that if the amount of panning on the screen could coincide with the amount or degree of movement of the device, by moving the device back and forth, and if a sufficient frame rate could be maintained, using the "persistence of vision" and "positive after images" associated with the eyes, an apparent larger image, which exceeds the size of the display can be realized. The back and forth movement of the device, and the correspondingly panned image, periodically refreshes the respective portion of the image across an area that has a size, which is larger than the size of the display. In this way an apparent larger screen image can be realized. In addition to a back and forth movement a circular movement could also be used to create image effects that exceed the screen size in more than a single dimension.

SUMMARY OF THE INVENTION

The present invention provides a display circuit for use in a hand held device. The display circuit includes a display, a memory, a motion sensor, and a controller. The display has a predetermined size, and the memory has stored therein an image, which has an image size, that is larger than the size of the display.

The motion sensor detects the movement of the hand held device and the corresponding movement of the display. The controller, which is coupled to the motion sensor, via prestored instructions, determines the current position of the hand held device and displays a portion of the image on the display, corresponding to the present position of the device. As the hand held device moves, the image being displayed on the display is panned an amount, which matches the movement of the hand held device.

In at least one embodiment, the motion sensor includes one or more accelerometers for detecting the acceleration of the hand held device in one or more directions of movement.

In at least a further embodiment, the motion sensor includes a position sensor for determining the position of the device, wherein the amount of movement is determined as the difference between two position measurements.

The present invention further provides a method of displaying an image on a display, where the size of the image is larger than the display. The method includes displaying a portion of the image on the display. The display is then moved, where the amount of movement of the display is detected. The portion of the image being displayed, is then updated, where the portion of the image being displayed has been offset an amount corresponding to the amount that the display has been moved.

These and other features, and advantages of this invention are evident from the following description of one or more preferred embodiments of this invention, with reference to the accompanying drawings.

DETAILED DESCRIPTION OF THE PREFERRED EMBODIMENT(S)

Figure 1:
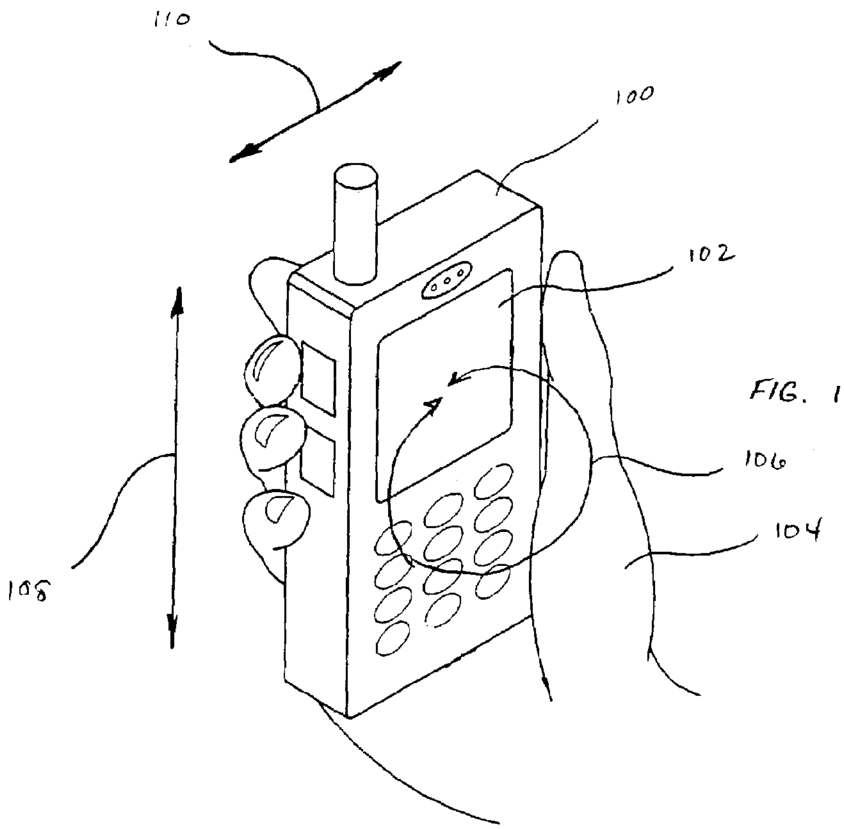
FIG. 1 is a perspective view of a hand held device with a display, being held by a user and moved, in accordance with at least one embodiment of the present invention.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

FIG. 1 illustrates a perspective view of a hand held device 100 with a multi-dimensional display 102, being held by a user 104. In the illustrated embodiment, the display is two-dimensional having both height and width. While held in the hand of the user 104, the device 100 can be moved in many different ways, including back and forth, or in a circular fashion 106. The back and forth movement can include both an up and down movement 108, or side to side movement 110.

By moving the device 100, and correspondingly tracking the portion of an image being shown on the display 102, a virtual image having a size larger than the display 102 can be created.

Figure 2:
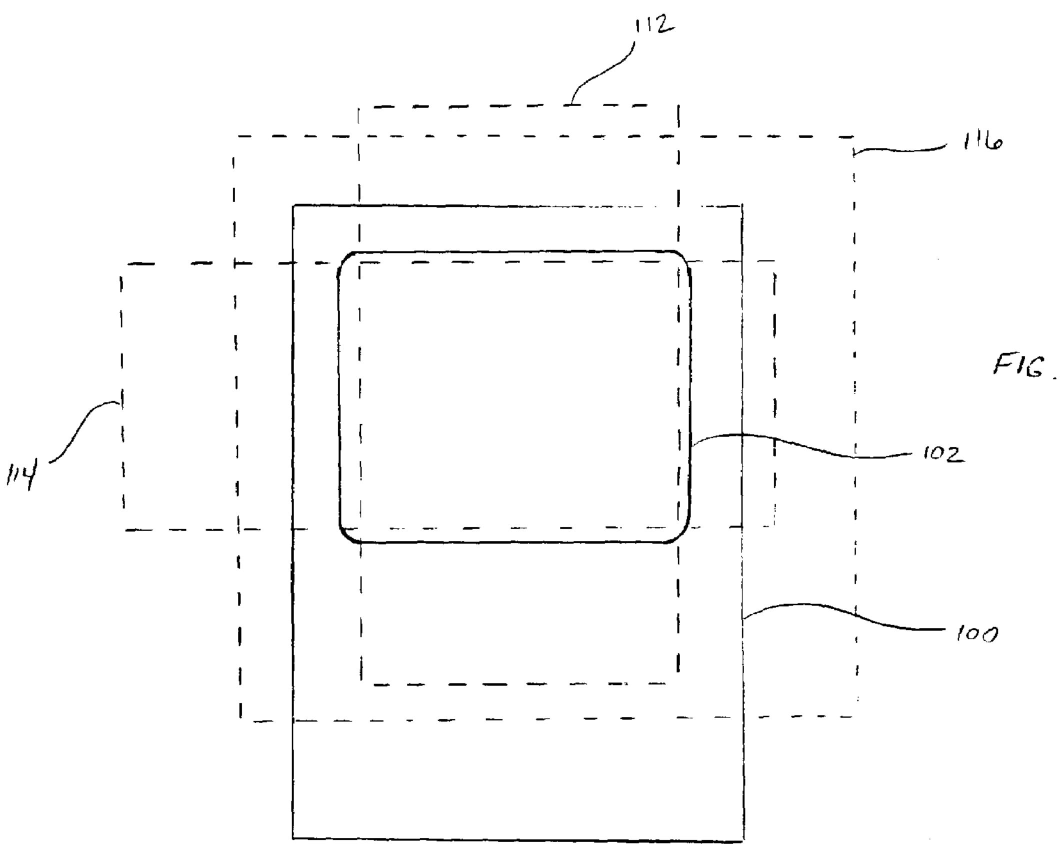
FIG. 2 is a front plan view of several examples of the size and shape of a virtual image with respect to the size and position of the display of the hand held device.

Several examples of an image having an image size larger than the size of the display 102 are illustrated in FIG. 2. A first image 112 has a width, that corresponds to the width of the display, and a height, that exceeds the height of the display. The first image can be viewed as a larger virtual image by moving the display in an up and down motion 108. A second image 114 has a height, that corresponds to the height of the display, and a width, that exceeds the width of the display. A greater portion of this image 114 can generally be more readily viewed by moving the display in a side to side motion 110. A third exemplary image 116 has both a height and a width, that exceeds the height and the width of the display. The third exemplary image 116 can be more readily viewed using a circular motion 106. Other types of motion would similarly be possible for virtually expanding the portion of the image being displayed.

For example, it is possible that other types of motion could be used to display more of the third exemplary image 116. For example a side to side motion 110, or an up and down 108 motion could be alternatively used, but these motions would only serve to create an expanded virtual image in a single dimension, and therefore a portion of the image would remain uncreated, unless another more complicated motion was additionally incorporated. Still further, a repetitive diagonal movement could be used to virtually expand the display in a diagonal direction of movement. By tailoring one's movement of the device, a user can focus more closely on the areas of interest in the display, where virtual expansion is desired.

In order to create the beneficial blurring effect, necessary in creating a larger virtual image, where the subsequent movement of the display through the same space refreshes the previously displayed portion of the image, the relative panning of the image on the display needs to track the relative movement of the display of the device. Additionally, the rate at which the portion of the displayed image is refreshed needs to be sufficiently fast to be refreshed before the after image has a chance to fade.

The position of the device can be tracked in at least a couple of ways. At least a first embodiment incorporates a motion sensor, which directly tracks the direction and the amount of movement of the device. One such motion sensor incorporates at least one accelerometer, which tracks the acceleration of the device in at least a first direction. The position of the device is then maintained by double integrating the acceleration over time. Multiple accelerometers can be used to track acceleration in multiple directions. If a velocity based sensor is used, only a single integration may be necessary to determine relative position.

In at least a further embodiment, the relative position of the device is determined via triangulating the position of the device relative to other elements having a known location, such as through a Global Positioning System (GPS), or an assisted global positioning system. One such technique determines a device's location by monitoring the device's distance relative to multiple satellites, where the location of each satellite is generally known or can be readily determined. Such a technique can be used to resolve the device's absolute position, relative to the frame of reference of the global positioning system. A relative position of the device over time can be computed by determining the difference between two measurements of the device's absolute position. In addition to satellites, it is further possible to triangulate from other elements, which are terrestrial based, such as base stations, or other more locally positioned devices, including devices which may be positioned and maintained by the user.

In a still further embodiment, the back side of the device facing in the opposite direction of the display surface may be equipped with a roller ball or an optical sensing device, like those found in either a mechanical or an optical computer mouse. The device can then be brought into contact with or proximity to a surface and moved in a repetitive fashion. The relative movement between the surface and the mouse type motion detector can be used to track the relative movement of the device.

In yet a still further embodiment, an optical image can be received via a camera-like lens and a corresponding CCD, especially in devices having an integrated camera or like device. An image processor can then track the relative movement of a point in the image to track relative motion.

Once the degree of movement of the device is known, and after taking into account the display characteristics of the display, the image can be panned an amount, which virtually expands and/or refreshes a previously displayed portion of the image.

In at least one embodiment the display is updated at a fixed rate. In some of these embodiments, the updating of the screen corresponds to the completion of a scan. During this period, the detected overall movement of the device is determined by aggregating any incremental determinations of movement during the prescribed finite duration between scans, which corresponds to the fixed rate. At the end of the prescribed period, the image being displayed is updated accordingly.

Figure 3:
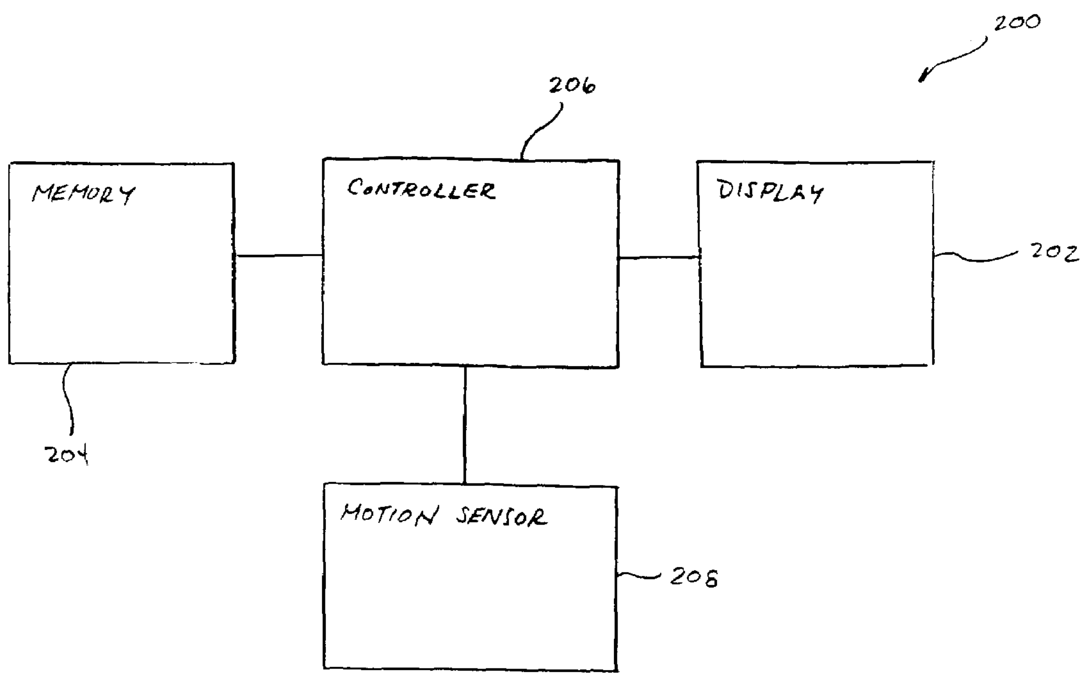
FIG. 3 is a block diagram of a display circuit in accordance with the present invention.

FIG. 3 illustrates a block diagram of a display circuit 200, in accordance with the present invention. The display circuit 200 includes a display 202 having a predetermined size, which is generally commensurate with the size of the device in which it is associated. The display circuit 200 additionally includes a memory 204, in which an image is stored. The image has a size that is larger than the size of the display 202. A controller 206 is coupled to each of the memory 204 and the display 202. The controller 206 displays at least a portion of the image, that is stored in the memory 204, onto the display 202.

A motion sensor 208 is coupled to the controller 206. The motion sensor 208 in conjunction with the controller 206 enables the display circuit to determine the relative location of the display 202. Based upon the determination of the present location of the display 202, relative to the previous location of the display 202, a different portion of the image will be displayed. The image is panned or offset an amount corresponding to the movement of the handheld device 100.

As noted previously, the motion sensor 208 can include sensors, which detect relative position by monitoring acceleration over time, or can include sensors, which detect the present position relative to external objects, where the location of the external objects are known.

Figure 4:
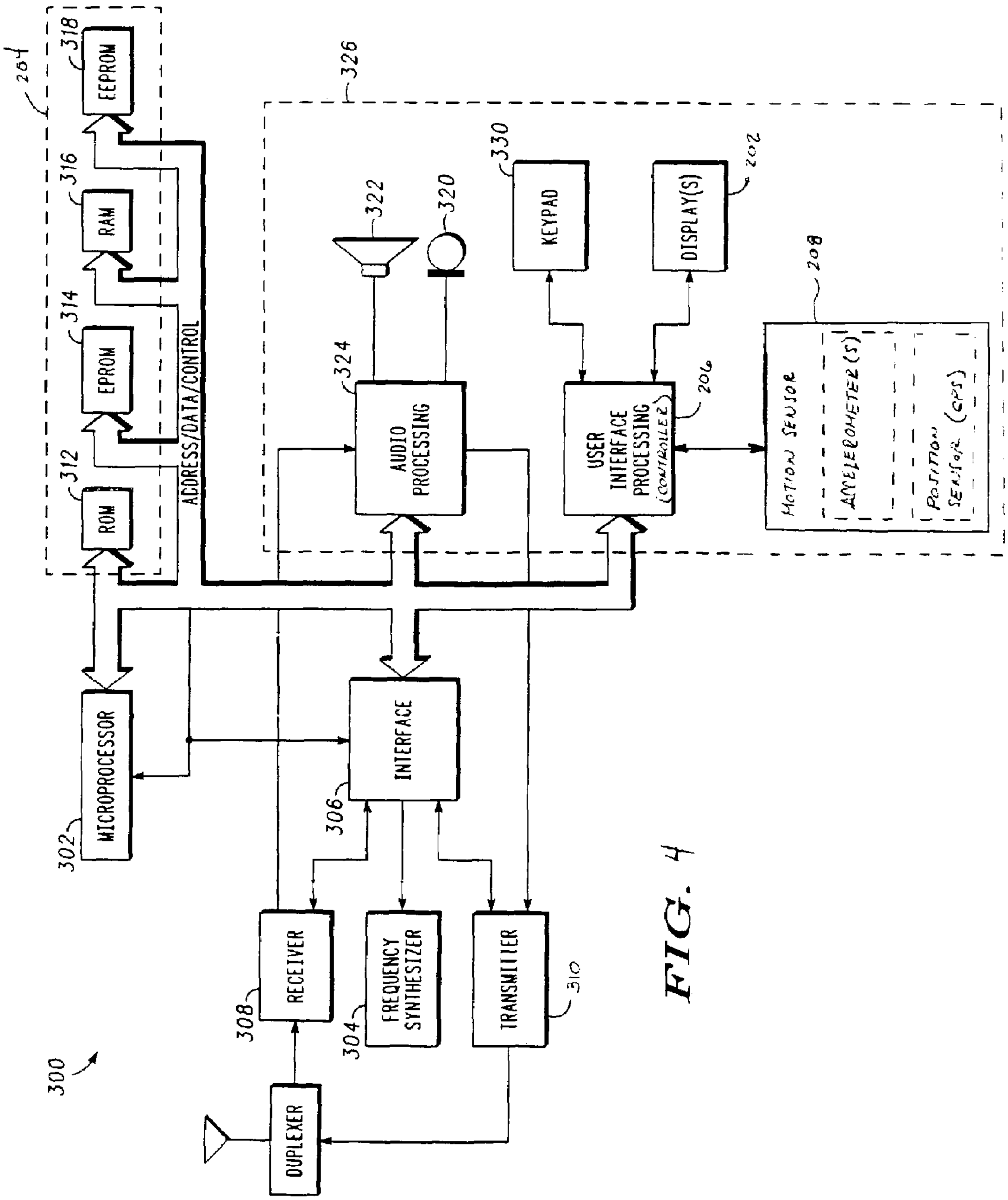
FIG. 4 is a block diagram of a wireless communication device, within which the display circuit of FIG. 3 can be incorporated.

FIG. 4 illustrates a block diagram of a wireless communication device 300, like a cellular telephone, within which the present invention can be incorporated. Generally, the wireless communication device communicates information via radio frequency signals. In the wireless communication device 300, the particular radio frequency is determined by the microprocessor 302. The particular radio frequency is conveyed to the frequency synthesizer 304 via the interface circuitry 306. Data signals received by the receiver 308 are decoded and coupled to the microprocessor 302 by the interface circuitry 306, and data signals to be transmitted by the transmitter 310 are generated by the microprocessor 302 and formatted by the interface circuitry 306 before being transmitted by the transmitter 310. Operational status of the transmitter 310 and the receiver 308 is enabled or disabled by the interface circuitry 306.

In at least one embodiment, the microprocessor 302, an audio processor 324, and a user interface processor 206 perform many of the processing functions under the control of program instructions stored in a memory section 204. Together, the microprocessor 302, the audio processor 324, and the user interface processor 206 can include one or more microprocessors, one or more of which may include a digital signal processor (DSP). The memory section 310 includes one or more forms of volatile and/or non-volatile memory including conventional ROM 312, EPROM 314, RAM 316, or EEPROM 318. One skilled in the art will readily recognize that other types of memory are possible.

Characterizing features of the wireless communication device are typically stored in EEPROM 318 (which may also be stored in the microprocessor in an on-board EEPROM, if available) and can include the number assignment (NAM) required for operation in a conventional cellular system and/or the base identification (BID) required for operation with a cordless base. Additionally stored in the memory section 310 are the multiple sets of prestored instructions for determining the present position of the device 100, and for displaying an appropriate portion of the image on the display 202, as well as data associated with the image to be displayed on the display 202.

Control of user audio, the microphone 320 and the speaker 322, is controlled by the audio processor or audio processing circuitry 324, which forms part of a user interface circuit 326. The user interface circuit 326 additionally includes the user interface processor or user interface processing circuitry 328, which manages the operation of any keypad(s) 330 and/or display(s) 332. It is further envisioned that any keypad operation could be included as part of a touch sensitive display. Some or all of the various controller elements associated with determining a relative location of the device 100, and the displaying of the corresponding portion of the image on the display 202 can be performed by the user interface processor 206, other portions of the various controller elements could be performed in one or more of the other processors, microprocessor 302 and/or audio processor 324.

Figure 5:
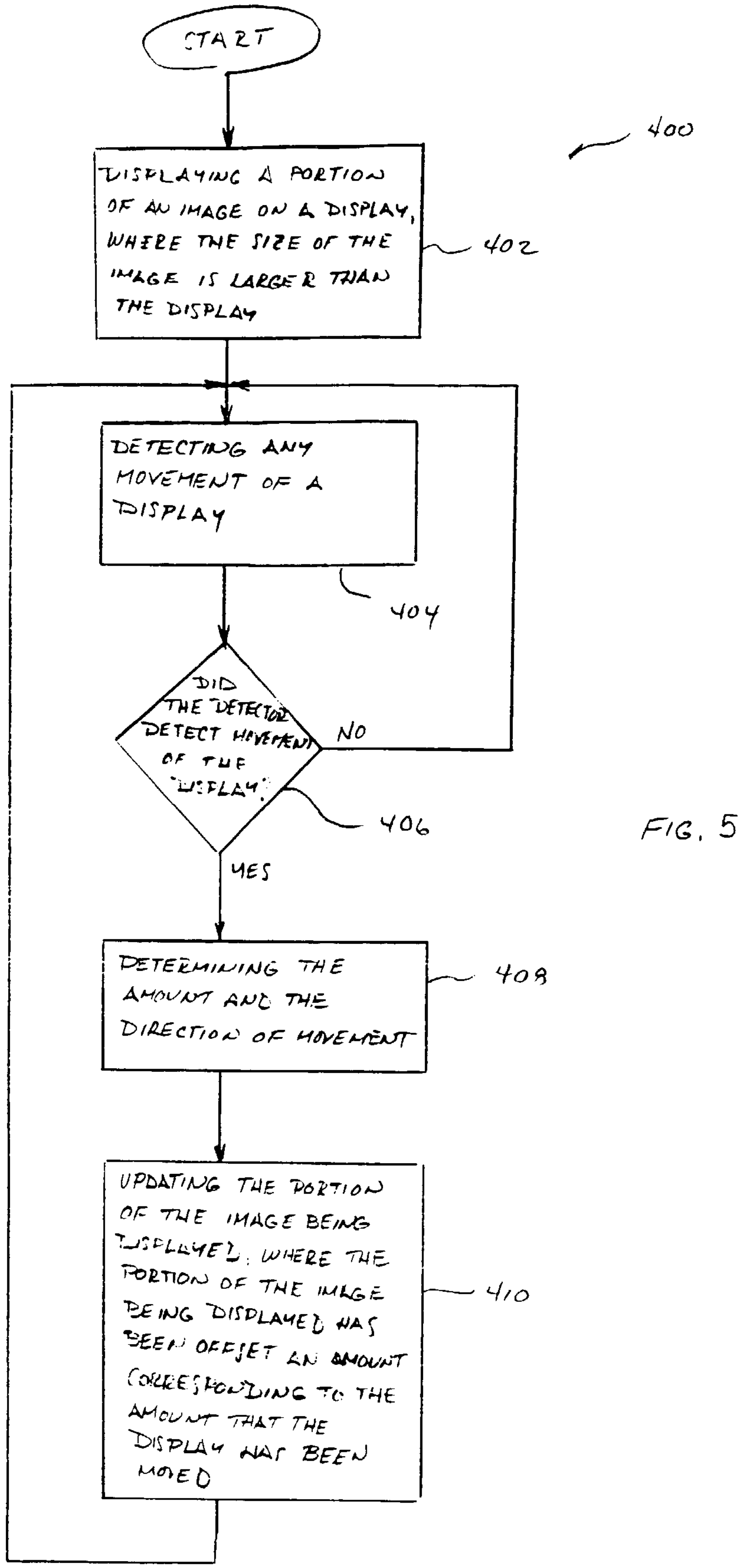
FIG. 5 is a flow diagram of a method of displaying an image on a display, wherein the size of the image is larger than the display, in accordance with at least one embodiment of the present invention.

FIG. 5 illustrates a flow diagram of a method 400 of displaying an image on a display, wherein the size of the image is larger than the display. The method includes displaying 402 a portion of an image on a display. The movement of the device is then monitored by detecting 404 any such movement. A determination is then made 406, if any movement was detected. If no movement was detected, than the device continues to monitor for any movement. If movement was detected, the amount and the direction of movement is determined 408. Then depending on the direction and the amount of the movement, the portion of the image being displayed is updated 410, where the portion of the image is offset or panned an amount corresponding to the direction and the amount of movement.

While the present invention has generally been described in association with a wireless communication device, like a cell phone, radiotelephone, or a cordless telephone, one skilled in the art will readily recognize that the invention is suitable for use with other types of devices, where the display can be readily shifted in a repetitive manner to create the virtual display type effect. A couple of additional examples of other types of devices, where the use of the present invention would be suitable include paging devices, personal digital assistants, portable computers, pen-based or keyboard-based handheld devices, remote control units, an audio player (such as an MP3 player) and the like.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A display circuit for use in a hand held device, comprising:

a display having a predetermined size;

a memory including information relating to an image having an image size, which is larger than the size of the display;

a motion sensor for detecting the movement of the hand held device and the corresponding movement of the display; and a controller, coupled to the motion sensor, including prestored instructions for determining the current position of the hand held device and for displaying a portion of the image on the display, corresponding to the present position of the device, wherein the amount the image being displayed on the display is panned matches the amount of movement of the hand held device.

2. The display circuit in accordance with claim 1 wherein the motion sensor includes one or more accelerometers for detecting the acceleration of the hand held device in one or more directions of movement.

3. The display circuit in accordance with claim 2 wherein the controller includes prestored instructions for double integrating the detected acceleration for determining the instantaneous position of the device relative to the previous position of the device.

4. The display circuit in accordance with claim 1 wherein the motion sensor includes a position sensor for determining the position of the device, wherein the amount of movement is determined as the difference between two position measurements.

5. The display circuit in accordance with claim 1 wherein the controller updates the screen at a sufficiently high frame rate to minimize flicker and to enable the rapid movement of the device to give the appearance of an image that is larger than the size of the display.

6. The display circuit in accordance with claim 5 wherein the rapid movement of the device includes back and forth movement.

7. The display circuit in accordance with claim 5 wherein the rapid movement of the device includes circular movement.

8. The display circuit in accordance with claim 5 wherein the frame rate is sufficient to create the instantaneous perception of a larger display.

9. The display circuit in accordance with claim 5 wherein the frame rate is substantially equal to or greater than fifty frames per second.

10. The display circuit in accordance with claim 1 wherein the hand held device is a wireless communication device.

11. A method of displaying an image on a display, wherein the size of the image is larger than the display, the method comprising:

displaying a portion of the image on the display;

moving the display;

detecting the amount of movement of the display;

updating the portion of the image being displayed, wherein the portion of the image being displayed has been panned an amount which matches the amount that the display has been moved.

12. The method in accordance with claim 11 wherein detecting the amount of movement of the display includes detecting the acceleration of the display in one or more directions of movement, and double integrating the detected acceleration for determining the instantaneous position of the display, relative to the previous position of the display.

13. The method in accordance with claim 11 wherein detecting the amount of movement of the display includes detecting the position of the display, and determining the difference in two position measurements to determine a corresponding amount of movement.

14. The method in accordance with claim 11 wherein moving the display includes the rapid repetitive movement of the display.

15. The method in accordance with claim 14 wherein the rapid movement of the display includes a movement, which is back and forth.

16. The method in accordance with claim 14 wherein the rapid movement of the display includes a movement, which is circular.

17. The method in accordance with claim 11 wherein the portion of the image being displayed is updated at a sufficiently high frame rate to minimize flicker, and to enable the persistence of the eye of the user to perceive an image, which is larger than the display upon which the image is being displayed.

18. The method in accordance with claim 17 wherein frame rate is sufficient to create the instantaneous perception of a larger display.

19. The method in accordance with claim 17 wherein frame rate is substantially equal to or greater than fifty frames per second.

20. The method in accordance with claim 11 wherein the display is incorporated as part of a hand held wireless communication device.

* * * * *